United States Patent [19]
Knutsson

[11] 3,794,438
[45] Feb. 26, 1974

[54] COUNTERSINK ASSEMBLY

[76] Inventor: Ake Knutsson, Strandvagen 10, Traryd, 280-50, Stromsnasbruk, Sweden

[22] Filed: Feb. 10, 1972

[21] Appl. No.: 225,150

[52] U.S. Cl................. 408/231, 408/193, 408/224, 10/140
[51] Int. Cl....................... B23b 51/10, B23b 51/16
[58] Field of Search... 408/224, 223, 231, 238, 199, 408/241, 226, 191, 193; 10/140

[56] References Cited
UNITED STATES PATENTS

| 534,881 | 2/1895 | Hearne et al. ........................ 10/140 |
| 3,346,894 | 10/1967 | Lemelson............................. 10/140 |

FOREIGN PATENTS OR APPLICATIONS

| 497,444 | 2/1957 | Germany ........................... 408/226 |
| 348,850 | 5/1922 | Germany ........................... 408/223 |
| 45,027 | 5/1917 | Sweden.............................. 408/226 |

Primary Examiner—Francis S. Husar
Attorney, Agent, or Firm—Markva & Smith

[57] ABSTRACT

The assembly includes at least two countersink cutting elements having a cutting edge structure. Each cutting element has an internal structural configuration adapted to enclose a drill member whereby a cutting tool is formed around the drill member to countersink any hole formed by the drill member. The external tool surface has a configuration that is operatively associated with a tightening mechanism. The tightening mechanism includes a top case section and a bottom case section which have mutually cooperating surfaces allowing the case sections to be tightly pulled toward each other. The inner surface configurations of the case sections are operatively associated with the external tool surface configuration in such a manner that the cutting elements are pressed tightly against the drill member when the case sections are tightened with respect to each other. Means are also provided to prevent filings from appearing between the assembly and the internal walls of the holes being formed.

4 Claims, 5 Drawing Figures

PATENTED FEB 26 1974  3,794,438

COUNTERSINK ASSEMBLY

BACKGROUND OF THE INVENTION

Devices used to countersink or widen holes during boring are well known. For example, it is well known to countersink holes to accommodate screw heads, bolt heads, and other similar structures that may be fixed within the countersunk hole. However, such prior art devices have been cumbersome and to a large extent have been virtually impossible to use. It has been found that a certain amount of filings have appeared within the drill bore hole and the countersunk hole. When such filings have appeared in the bore hole, an extremely large amount of friction results and both the drill and the countersink assembly have been destroyed.

Another disadvantage of the prior art devices is that they are not satisfactorily held in place on the drill member. Therefore, an unsatisfactory countersunk hole has resulted. When the countersink assembly is not tightly held on the drill member, it will not rotate in the proper proportion to the speed of the drill member. Thus, a satisfactory countersinking operation is thereby prevented.

PURPOSE OF THE INVENTION

The primary object of this invention is to provide a countersink assembly that is simple in construction and is extremely reliable and easily attached to a drill member.

A further object of this invention is to provide a countersink assembly which will prevent the filings from the countersink bore from being maintained within the drilled holes.

A further object of the invention is to provide a countersink assembly that will be firmly attached to a spiral drill.

SUMMARY OF THE INVENTION

These objects and other advantages are accomplished through the use of the countersink assembly made in accordance with this invention. The countersink assembly includes at least two countersink cutting elements which have a structural configuration that is compatible so that they form a complete cutting tool. Each of the cutting elements has an internal structural configuration adapted to enclose a drill member so that the cutting drill is formed therearound to countersink the hole formed by the drill. The assembly includes a tightening mechanism which is used to fix the cutting elements tightly onto the drill member. Each of the cutting elements includes cutting edges to form the countersunk hole in conjunction with the hole formed by the drill member. In a specific embodiment of the invention, there are two countersunk cutting elements which have a semi-circular axial track which, when the halves are placed toward each other, form a central hole in which the drill member is placed.

Another feature of the invention is directed to the manner in which the tightening mechanism is adapted to fix the assembly onto a spiral drill. The tightening mechanism has a top section and a bottom section that are adapted to fit together and be securely tightened with respect to each other. The top and bottom sections have an internal structural configuration that is operatively associated with the external surface of the cutting tool formed by the cutting elements. In a specific embodiment of the invention, the external tool surface includes a conically formed top portion and a conically formed bottom portion over which the top section and bottom section, respectively, of the tightening mechanism are fitted. The top and bottom sections include mutually cooperating threaded portions which are used to screw the tightening sections together. The more tightly the sections are screwed together, the more tightly the assembly becomes fixed onto a drill member.

A further feature of the invention is directed to the use of a swarf diverter which forms canals to divert any filings from being maintained in the bore hole. A further feature of the diverting capacity of the countersink assembly is that the cutting edges of each of the cutting elements engages the space behind the cutting spirals of a drill by an amount effective to prevent filings from appearing between the bore hole and the countersinking assembly.

BRIEF DESCRIPTION OF DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
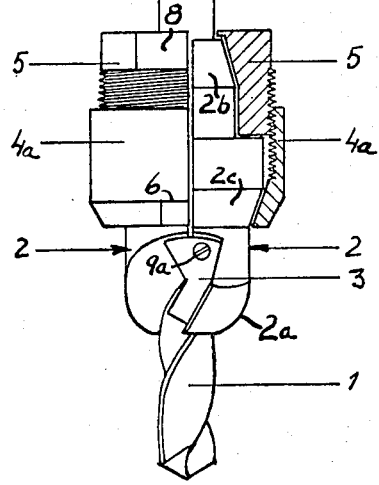
FIG. 1 is a side elevational view partially in cross-section of a countersink assembly made in accordance with this invention.
Figure 2:
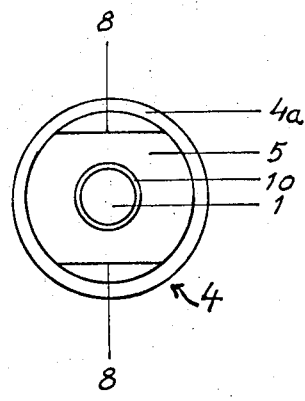
FIG. 2 is a top plan view of a tightening mechanism used with the countersink assembly of FIG. 1.
Figure 3:
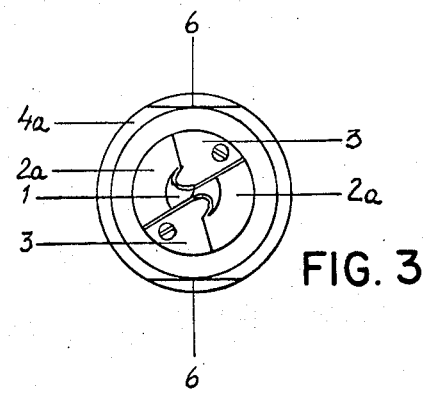
FIG. 3 is a bottom plan view of the assembly as shown in FIG. 1.
Figure 4:
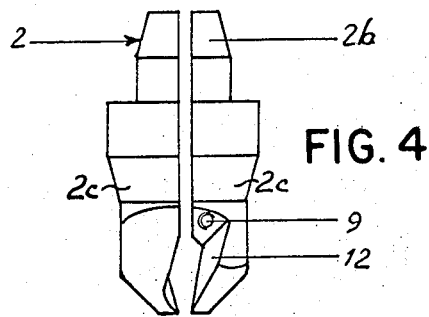
FIG. 4 is a side elevational view of two countersink cutting elements made in accordance with this invention.
Figure 5:
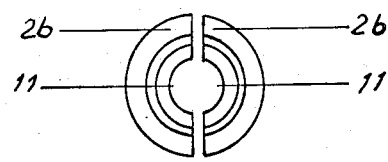
FIG. 5 is a top plan view of the elements as shown in FIG. 4.

More specifically, the countersink assembly as shown in the drawings is adapted to be placed around the spiral drill 1. In this specific embodiment, two countersink cutting elements 2 together form a countersink cutting tool which is firmly held onto the drill 1. Each of the countersink cutting elements 2 forms a longitudinal half of a countersink cutting tool. Each of the elements 2 includes an internal structural configuration having an axial, semicircular track 11. The countersink cutting tools may be formed in such a manner that the various halves thereof can be exchanged by halves of other countersink tools forming the same outside diameter but having varying inside diameters which may be fitted onto drill members having different diameters. The elements 2 include cutting edges 2a which may be formed for either a plane or a tapped countersunk hole.

The external surface of the cutting tool includes a top portion having an inclined surface and a bottom portion having an inclined surface.

A tightening mechanism 4 is used to keep the cutting elements 2 held in the desired position on the spiral drill 1. The tightening mechanism has an internal structural configuration to be operatively associated with the inclined surfaces on the external surface of the tool. The tightening mechanism 4 includes a top pressure cover section 5 and a bottom case section 4a. The top cover section 5 includes outside threaded surface which operatively engages internal threads disposed along the inside of the bottom case section 4a. The cover section 5 and bottom section 4a may be tightened or pressed together along the mutually cooperating threaded portions.

The inner surface configuration of the top cover section 5 and the bottom case section 4a are operatively associated with the outer surface of the cutting members 2. That is, in this specific embodiment, the cover 5 has a conically shaped internal surface configuration which is adapted to cooperate with the conically shaped external surface configuration 2b of the cutting elements 2. The bottom case member 4 has a conically shaped internal surface configuration which is in operative contact with the conically shaped portion 2c of the cutting elements 2. The top cover section 5 includes a hole or opening 10 corresponding to the diameter of the drill 1.

The countersink assembly of this invention may be attached to spiral drill 1 by first placing the cutting elements 2 on the drill. The lower conical surface portions 2c are placed into the corresponding cooperating internal conically formed portion of the lower body case section 4a. The top pressure cover 5 is then screwed into the bottom section 4a. The upper conically shaped surface 2b located on the cutting members 2 is in operative contact with the inside of the conically formed internal surface of the top cover 5. When the top cover 5 is screwed into the bottom case section 4a, a downward and inward pressure is exerted on the cutting elements 2 so that they enclose the drill 1. The more tightly the cover 5 is screwed into the case section 4a, the harder the cutting elements 2 will press against the enclosed drill 1.

The outer surface of the top pressure cover 5 includes a beveling 8 and the outer surface of the bottom case section 4a includes a bevel surface 6. The beveled surfaces 8 and 6 enable the artisan to use suitable tools for the purpose of drawing the pressure cover 5 tightly into the internal threads of the bottom case section 4a.

An internally threaded hole 9 is located on each of the countersink halves or cutting elements 2. A screw 9a is used to fixedly attach a diverter 3 onto each of the cutting members. The swarf diverter member 3 is attached to one cutting element 2 and extends to an adjacent cutting element 2. The diverter 3 includes a point portion which is directed outwardly and turned into the spirals of the drill 1 by an amount effective to form a diverting canal between the drill and countersink assembly. Further, each of the cutting elements 2 includes an internal wall surface 12 which together with the diverter 3 defines a diverting canal to prevent the ingress of swarf from becoming entangled in the assembly. The diverter 3 may be arranged so that if the countersink assembly slips, the diverter 3 is pushed clear of the drill 1.

While the countersink assembly has been shown and described in detail, it is obvious that this invention is not to be considered as being limited to the exact form disclosed, and that changes in detail and construction may be made therein within the scope of the invention, without departing from the spirit thereof.

I claim:

1. A countersink assembly comprising:
    a. a cutting tool having a cylindrically shaped external surface and including two countersink cutting elements having a semicircular shaped internal axial track,
    b. said cutting elements being adapted to enclose a spiral drill member at a location intermediate the ends of the drill member,
    c. said cutting elements including a cutting edge structure adapted to engage the space between the cutting spirals of the drill member so that the ingress of swarf is prevented during the countersinking of a hole formed by the drill member,
    d. a swarf diverter member attached to one cutting element and extending to an adjacent cutting element,
    e. each said cutting element including an internal wall adjacent said swarf diverter member to form a swarf diverting canal,
    f. said external surface of the tool including a top portion having an inclined surface and a bottom portion having an inclined surface, and
    g. a tightening mechanism having a top cover section with a central opening therein and a bottom case section,
    h. said cover and case sections having internal inclined surfaces which mate with the external inclined surfaces of the cutting tool and being adapted to fit together and be securely tightened with respect to each other,
    i. whereby, when the top cover section and the bottom case section are forced together, the cutting elements are tightly forced against the drill member thereby fixing the position of the countersink assembly at said intermediate location so that the ends of the drill member project outwardly from the countersink assembly.

2. An assembly as defined in claim 1 wherein
    said external tool surface includes a conically shaped top portion and a conically shaped bottom portion consituting said external inclined surfaces,
    said top cover section and said bottom case section each includes conically shaped inner surfaces constituting said internal inclined surfaces,
    said top cover section and bottom case section have mutually cooperating threaded portions whereby said sections may be screwed together along the mutually cooperating threaded portions.

3. An assembly as defined in claim 1 wherein
    said diverter member includes a point portion which is directed into the inwardly turned spirals of the drill member to form a diverting canal between the drill member and the countersink assembly.

4. An assembly as defined in claim 1 wherein
    each cutting element includes a shoulder abutment located between the top and bottom portions.

\* \* \* \* \*